United States Patent
Kaga et al.

(10) Patent No.: US 11,115,214 B2
(45) Date of Patent: Sep. 7, 2021

(54) BIOMETRIC SIGNATURE SYSTEM AND BIOMETRIC SIGNATURE METHOD

(71) Applicant: Hitachi, Ltd., Tokyo (JP)

(72) Inventors: Yosuke Kaga, Tokyo (JP); Kenta Takahashi, Tokyo (JP); Masakazu Fujio, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 16/491,129

(22) PCT Filed: Feb. 14, 2018

(86) PCT No.: PCT/JP2018/005142
§ 371 (c)(1),
(2) Date: Sep. 4, 2019

(87) PCT Pub. No.: WO2018/225297
PCT Pub. Date: Dec. 13, 2018

(65) Prior Publication Data
US 2020/0014540 A1    Jan. 9, 2020

(30) Foreign Application Priority Data
Jun. 9, 2017   (JP) .............................. JP2017-114023

(51) Int. Cl.
*G06F 21/32* (2013.01)
*H04L 9/32* (2006.01)
(Continued)

(52) U.S. Cl.
CPC ............ *H04L 9/3231* (2013.01); *G06F 21/32* (2013.01); *G06F 21/64* (2013.01); *H04L 9/0866* (2013.01); *H04L 9/3247* (2013.01)

(58) Field of Classification Search
CPC ... H04L 9/3231; H04L 9/0866; H04L 9/3247; G06F 21/32; G06F 21/64
See application file for complete search history.

(56) References Cited

U.S. PATENT DOCUMENTS

| | | | |
|---|---|---|---|
| 2010/0332487 A1* | 12/2010 | Monden | G06K 9/00087 707/758 |
| 2011/0185176 A1* | 7/2011 | Takahashi | G06F 21/83 713/168 |
| 2013/0308834 A1* | 11/2013 | Suzuki | G06K 9/036 382/115 |

FOREIGN PATENT DOCUMENTS

| | | |
|---|---|---|
| EP | 1912151 A1 | 4/2008 |
| JP | 2013-123142 A | 6/2013 |

OTHER PUBLICATIONS

Extended European Search Report for related European Patent Application No. 18813523.0 dated Nov. 4, 2020 (9 pages).

\* cited by examiner

*Primary Examiner* — Alexander Lagor
(74) *Attorney, Agent, or Firm* — Procopio, Cory, Hargreaves & Savitch LLP

(57) ABSTRACT

A biometric signature system holds a first template indicating a result of transforming, by predetermined transformation, first biometric information acquired from a predetermined part of a user; and a second template indicating a result of transforming, by predetermined one-way transformation, second biometric information acquired from the predetermined part of the user, identifies a parameter for which a similarity between the first template of the person to be authenticated corrected, generates a second template of the person to be authenticated from each piece of corrected second biometric information, and determines whether authentication of the person to be authenticated is successful by comparing each generated second template with the second template.

12 Claims, 8 Drawing Sheets

(51) Int. Cl.
*G06F 21/64* (2013.01)
*H04L 9/08* (2006.01)

BIOMETRIC SIGNATURE SYSTEM AND BIOMETRIC SIGNATURE METHOD

CLAIM OF PRIORITY

The present application is a U.S. National Stage entry of PCT Application No: PCT/JP2018/005142, filed Feb. 14, 2018, which claims priority from Japanese patent application JP 2017-114023 filed on Jun. 9, 2017, the content of which is hereby incorporated by reference into this application.

BACKGROUND OF THE INVENTION

The present invention relates to a biometric signature system and a biometric signature method. There is known a biometric authentication technology of identifying a person based on his or her physical characteristics such as a fingerprint, a face, a vein, and an iris. In this biometric authentication technology, biometric information acquired from a user in advance is registered, and is compared with biometric information acquired at the time of authentication of a person, to thereby determine whether the person is the user. The biometric information indicates a characteristic that does not change through his or her entire life, and thus is treated as extremely delicate personal information. When biometric information has been leaked by some chance, the user can no longer continue to use the biometric information safely, and hence a high security is required for managing the biometric information.

There is known JP 2013-123142 A as a technology of implementing a public key infrastructure (PKI) with biometric information serving as a key while at the same time safely protecting the biometric information. JP 2013-123142 A has the following description (see Abstract): "At the time of registration, a biometric signature system embeds a predetermined secret key into a feature of biometric information on a user, and issues a biometric certificate containing a set of the feature and a corresponding public key. At the time of signature, the biometric signature system newly generates a pair of a temporary secret key and a temporary public key for a signature feature of biometric information on the user, creates a signature for a message through use of the temporary secret key, creates a commitment by embedding the temporary secret key into the signature feature, and sets a set of the temporary public key, the signature, and the commitment as a biometric signature. At the time of verification of the biometric signature, the biometric signature system verifies the signature based on the temporary public key, and generates a difference secret key and a difference public key from the biometric certificate, the commitment, and the temporary public key to verify their correspondence."

In the related-art biometric authentication, a similarity between registered biometric information and biometric information on a person to be authenticated is evaluated, and when the similarity is equal to or larger than a certain value, the authentication is determined to be successful. Meanwhile, an error as represented by a deviation in coordinates or angle occurs in biometric information every time the biometric information is acquired. Thus, when pieces of biometric information are compared with each other, a method that is robust in terms of an error in coordinates or angle is required to be adopted.

In the technology described in JP 2013-123142 A, biometric information acquired at the time of registration and biometric information acquired at the time of authentication are transformed into vectors having a fixed length, and when a similarity that uses a norm between those vectors is equal to or larger than a certain value, the authentication is determined to be successful. In this case, the norm between vectors cannot allow an error in coordinates or angle, for example, and thus the technology described in JP 2013-123142 A is required to generate a vector for each parameter of the coordinates or angle within an allowable range, for example, and verify whether the authentication is successful.

SUMMARY OF THE INVENTION

As a result, the amount of calculation required for authentication by the technology described in JP 2013-123142 A increases in proportion to the number of allowable parameters and the size of the range of allowable parameters. Therefore, at least one embodiment of the present invention has an object to implement a high-speed biometric signature system by reducing the amount of calculation at the time of authentication.

In order to solve the above problems, an aspect of the present invention adopts the following constructions. A biometric signature system, includes a processor and a memory, the memory being configured to hold: a first template indicating a result of transforming, by predetermined transformation, first biometric information acquired from a predetermined part of a user; and a second template indicating a result of transforming, by predetermined one-way transformation, second biometric information acquired from the predetermined part of the user, the processor is configured to: acquire the first biometric information and the second biometric information from a person to be authenticated; generate a first template of the person to be authenticated from the acquired first biometric information; identify a parameter for which a similarity between the first template of the person to be authenticated corrected by using the parameter and the first template held in the memory is larger than a predetermined condition; correct the second biometric information on the person to be authenticated by using each parameter included in a predetermined range including the identified parameter; generate a second template of the person to be authenticated from each piece of corrected second biometric information; and determine whether authentication of the person to be authenticated is successful by comparing each generated second template with the second template held in the memory.

The aspect of the present invention can implement a high-speed biometric signature. Problems, constructions, and effects which are not above-mentioned are explained in the following embodiments.

BRIEF DESCRIPTIONS OF DRAWINGS

The present invention can be appreciated by the description which follows in conjunction with the following figures, wherein.

DETAILED DESCRIPTION OF THE PREFERRED EMBODIMENTS

First Embodiment

In a first embodiment of this invention, a description is given of a one-to-one biometric signature system in which a user inputs an ID. The biometric signature system according to the first embodiment can execute authentication or signature verification at high speed by using first biometric information for intermediate comparison and using second biometric information for biometric signature.

Figure 1:
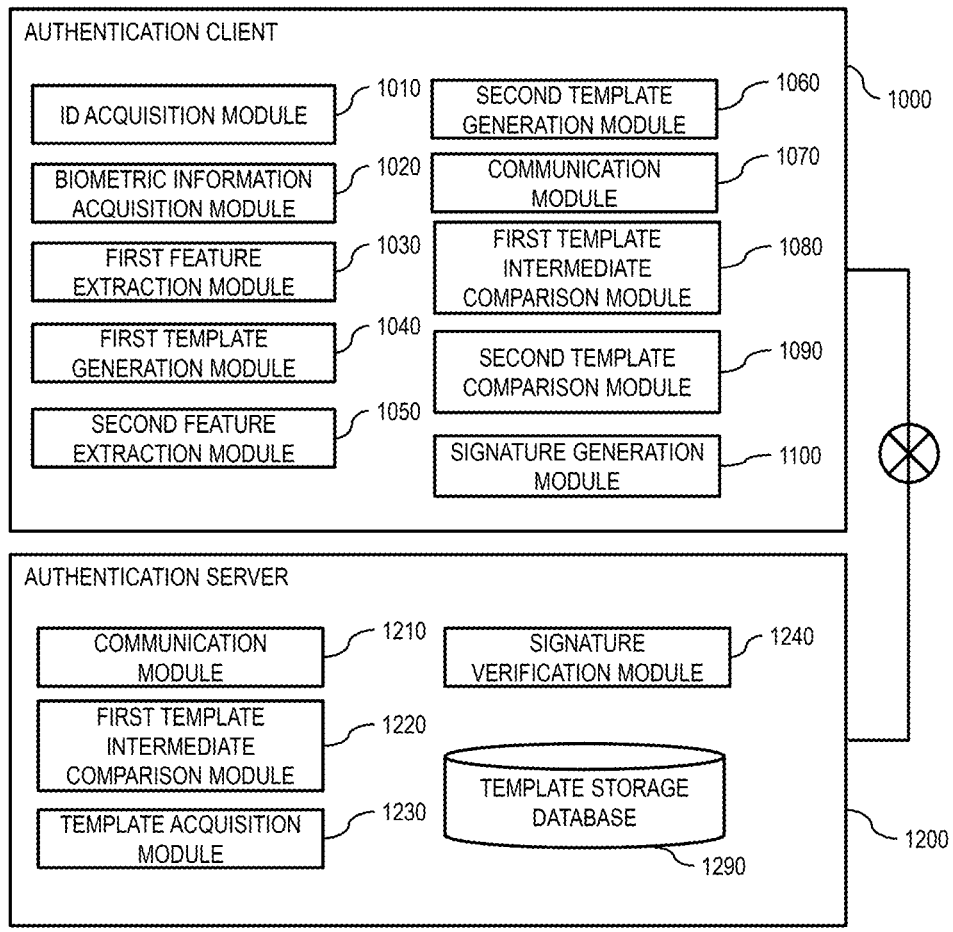
FIG. 1 is a block diagram for illustrating an example of a configuration of the biometric signature system according to the first embodiment.

FIG. 1 is a block diagram for illustrating an example of a configuration of the biometric signature system according to the first embodiment. The biometric signature system includes an authentication client 1000 and an authentication server 1200, which are coupled to each other via a network.

The biometric signature system may not be implemented by such a client-server system as illustrated in FIG. 1, but may be implemented by one computer.

The authentication client 1000 includes, for example, an ID acquisition module 1010, a biometric information acquisition module 1020, a first feature extraction module 1030, a first template generation module 1040, a second feature extraction module 1050, a second template generation module 1060, a communication module 1070, a first template intermediate comparison module 1080, a second template comparison module 1090, and a signature generation module 1100.

The ID acquisition module 1010 receives input of a user ID via an input device, for example, a keyboard. The biometric information acquisition module 1020 acquires first biometric information (surface features such as fingerprint and wrinkle of hand) and second biometric information (deep features, for example, vein of hand) on a user via a fingerprint sensor, a vein sensor, and a camera, for example.

The first feature extraction module 1030 extracts a first feature (e.g., features of fingerprint or image itself emphasizing wrinkle of skin of hand) from the first biometric information. The first template generation module 1040 subjects the first feature to transformation (e.g., correlation-invariant random filtering and other cancelable transformation) to generate a first template. The second feature extraction module 1050 extracts a second feature (e.g., image emphasizing vein) from the second biometric information.

The second template generation module 1060 subjects the second feature to one-way transformation in the biometric signature system to generate a second template. The "one-way transformation" refers to transformation by a transformation function (e.g., fuzzy signature) that can easily calculate forward transformation, but has a difficulty in calculating reverse transformation.

The communication module 1070 communicates to/from the authentication server 1200. The first template intermediate comparison module 1080 compares a first template registered in advance with a first template of a person to be authenticated, to thereby acquire an intermediate comparison result. The second template comparison module 1090 compares a second template registered in advance with a second template of the person to be authenticated, to thereby acquire a final comparison result (including result indicating success or failure of authentication and secret key extracted at the time of success of authentication). The signature generation module 1100 uses the secret key acquired when authentication is successful through comparison of second templates, to thereby generate a biometric signature.

The authentication server 1200 includes, for example, a communication module 1210, a first template intermediate comparison module 1220, a template acquisition module 1230, a signature verification module 1240, and a template storage database 1290.

The communication module 1210 communicates to/from the authentication client 1000. The first template intermediate comparison module 1220 compares a first template registered in advance with a first template of a person to be authenticated, to thereby acquire an intermediate comparison result. Processing to be executed by the first template intermediate comparison module 1220 is the same as processing to be executed by the first template intermediate comparison module 1080. In other words, the main processing may be executed by the authentication client 1000 or the authentication server 1200.

The template acquisition module 1230 acquires a first template and a second template from the template storage database 1290. The signature verification module 1240 executes verification of a signature received from the authentication client 1000. The template storage database 1290 stores the first template and second template acquired from the user in association with the user ID, for example.

Figure 2:
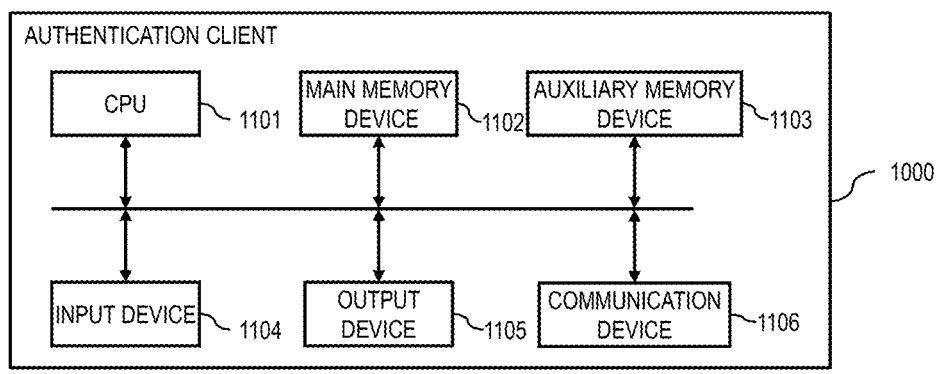
FIG. 2 is a block diagram for illustrating an example of a hardware configuration of the authentication client according to the first embodiment.

FIG. 2 is a block diagram for illustrating an example of a hardware configuration of the authentication client 1000. The authentication server 1200 also has a similar hardware configuration, and thus only the hardware configuration of the authentication client 1000 is described. The authentication client 1000 is configured by a computer including, for example, a central processing unit (CPU) 1101, a main memory device 1102, an auxiliary memory device 1103, an input device 1104, an output device 1105, and a communication device 1106.

The CPU 1101 includes a processor, and executes a program stored in the main memory device 1102. The main memory device 1102 includes a ROM, which is a nonvolatile memory device, and a RAM, which is a volatile memory device. The ROM stores, for example, an invariant program (for example, BIOS). The RAM is a dynamic random access memory (DRAM) or other such high-speed volatile memory device, and temporarily stores a program to be executed by the processor and data to be used at a time of execution of the program.

The auxiliary memory device 1103 is, for example, a magnetic storage device (HDD), a flash memory (SSD), or other such large-capacity nonvolatile storage apparatus, and stores the program to be executed by the CPU 1101 and the data to be used at the time of the execution of the program. In other words, the program is read from the auxiliary memory device 1103, and loaded into the main memory device 1102 to be executed by the CPU 1101.

The input device 1104 is a device for receiving input from the user, and includes a keyboard and a mouse, for example. The output device 1105 is a device configured to output the result of execution of a program in a format recognizable by the user, and includes a display device and a printer, for example. The communication device 1106 is a device configured to control communication to/from other devices in accordance with a predetermined protocol, and is used for communication by the communication module 1070 and the communication module 1210.

The program to be executed by the CPU 1101 is provided to the authentication client 1000 through intermediation of a removable medium (CD-ROM or flash memory) or through the network, and is stored in the nonvolatile auxiliary memory device 1103 being a non-transitory storage medium. Therefore, the authentication client 1000 preferably include an interface configured to read data from the removable medium.

The authentication client 1000 is a computer system formed on physically one computer or formed on a plurality of computers that are configured logically or physically, and may be operated on separate threads on the same computer, or may operate on a virtual machine built on a plurality of physical computer resources.

The CPU 1101 functions as the ID acquisition module 1010 by operating in accordance with an ID acquisition program loaded into the main memory device 1102, for example, and functions as the biometric information acquisition module 1020 by operating in accordance with a biometric information acquisition program loaded into the main memory device 1102. The other modules included in the authentication client 1000 function in a similar manner.

In the first embodiment, information to be used by the biometric signature system does not depend on data structure, and may be represented by any kind of data structure. For example, data structure appropriately selected from among a table, a list, a database, and a queue can store information.

Figure 3:
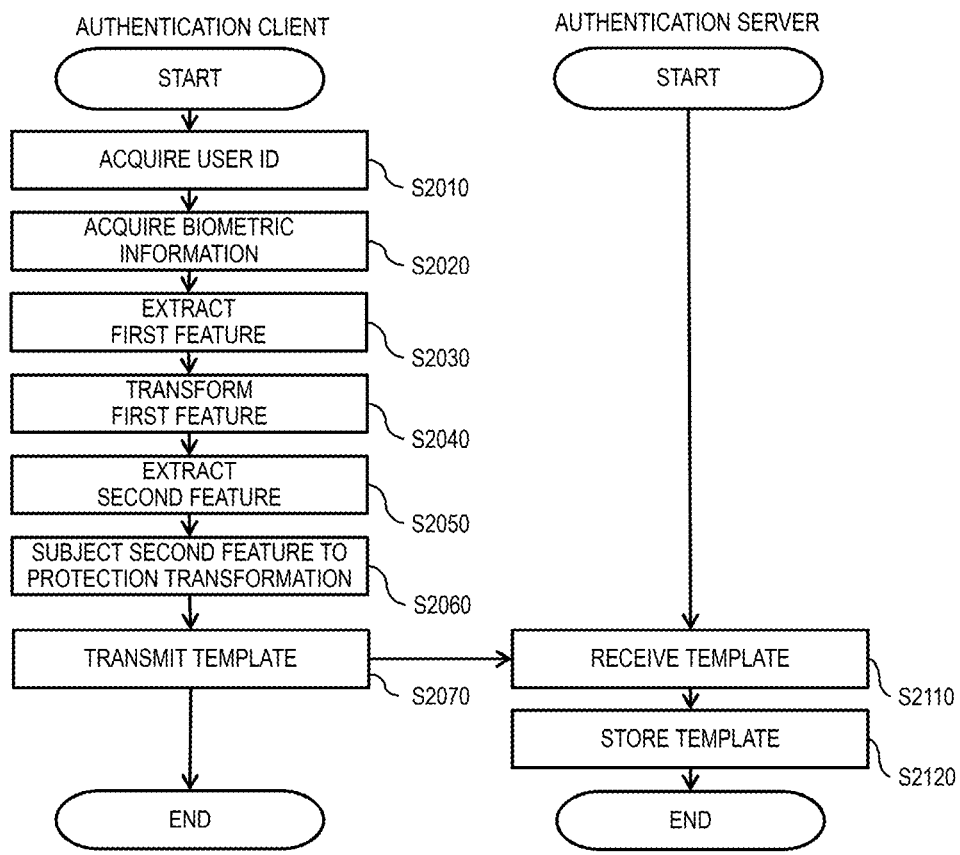
FIG. 3 is a flow chart for illustrating an example of processing of template registration according to the first embodiment.

FIG. 3 is a flow chart for illustrating an example of processing of template registration. First, the ID acquisition module 1010 of the authentication client 1000 acquires a user ID (Step S2010). Specifically, the ID acquisition module 1010 acquires a user ID being a character string formed of, for example, alphanumeric characters input by the user via the input device 1104, for example. Alternatively, the ID acquisition module 1010 may issue, as a user ID, a character string formed of, for example, alphanumeric characters at random or in series, without acquiring the user ID from the outside.

Then, the biometric information acquisition module 1020 acquires biometric information on the user (Step S2020). In the first embodiment, the biometric information acquisition module 1020 acquires first biometric information and second biometric information from the same part as the biometric information on the user. The first biometric information is biometric information to be used for intermediate comparison. The first biometric information is not used for a biometric signature, but is used to acquire the result of intermediate comparison, which is utilized for generation or verification of a biometric signature.

Further, the second biometric information is biometric information to be used for a biometric signature, and is used to implement authentication or signature while at the same time protecting the biometric information in a sophisticated manner. The first biometric information and the second biometric information are pieces of information that can be acquired from the same part of the user. Further, the first biometric information and the second biometric information are desired to have a low relevance therebetween. Specifically, for example, when the first biometric information has been leaked or revealed, the second biometric information is desired not to be easily estimated from the first biometric information.

For example, there is the following method as a method of acquiring the first biometric information and the second biometric information. The first method involves acquiring two different pieces of biometric information at the time of sensing of biometric information. Specifically, for example, this method involves switching the frequency of light radiated to the same part of the hand or the image processing method for the light, to thereby acquire a surface feature such as a fingerprint and/or wrinkles as the first biometric information, and acquire a deep feature, for example, a vein, as the second biometric information.

Further, the second method involves temporarily acquiring a single piece of biometric information, and dividing the biometric information into the first biometric information and the second biometric information in subsequent processing. Specifically, for example, two pieces of biometric information having a low relevance are generated from an image acquired from the same part based on various kinds of scales such as a luminance value, a hue, a frequency, and a phase, and the respective pieces of generated biometric information are used as the first biometric information and the second biometric information. In both of the methods, it is desired that a correlation coefficient between the first biometric information and the second biometric information stored in the template storage database 1290 be equal to or larger than a predetermined value.

Further, the method of acquiring the first biometric information and the second biometric information may involve executing different feature extraction processing, such as emphasizing processing or discretization, for an image acquired from the same part so as to generate a plurality of images having different features, and using the plurality of images as the first biometric information and the second biometric information, respectively.

The first feature extraction module 1030 extracts a first feature from the first biometric information acquired in Step S2020 (Step S2030). The first feature is a feature acquired as a result of subjecting the first biometric information to certain feature extraction processing. When the first biometric information is a fingerprint image, the first feature extraction module 1030 acquires a set of features called "minutia(e)" as the first feature, for example. Further, when the first biometric information is wrinkle information on skin, the first feature extraction module 1030 extracts stable wrinkle information by image processing, for example, as the first feature.

Next, the first template generation module 1040 subjects the first feature acquired in Step S2030 to transformation to generate a first template being the result of transformation (Step S2040). This transformation includes identity transformation that does not subject the first feature to transformation. Further, as transformation to be executed in generation of the first template, the first template generation module 1040 may execute so-called cancelable biometric authentication, which is transformation capable of calculating a correlation between features before transformation by comparing templates after transformation with each other.

Further, as transformation to be executed in generation of the first template, the first template generation module 1040 may execute general encryption such as data encryption standard (DES) encryption or advanced encryption standard (AES) encryption.

Next, the second feature extraction module 1050 extracts a second feature from the second biometric information acquired in Step S2020 (Step S2050). The second feature is a feature acquired as a result of subjecting the second biometric information to certain feature extraction processing. When the second biometric information is a vein image, the second feature extraction module 1050 executes image processing of emphasizing a vein, for example, and extracts, as the second feature, a vein pattern image obtained by discretizing a luminance value.

Next, the second template generation module 1060 subjects the second feature acquired in Step S2050 to protection transformation, namely, one-way transformation, to generate a second template being the result of transformation (Step S2060). The protection transformation includes, for example, biometric certificate generation disclosed in JP 2013-123142 A. The biometric certificate is information corresponding to a public key at a time when the biometric information is set as a secret key, and is used for extracting a secret key from the biometric information or verifying the biometric signature. In the first embodiment, the second template generation module 1060 generates information corresponding to the biometric certificate in JP 2013-123142 A as the second template.

Next, the communication module 1070 transmits the first template acquired in Step S2040, the second template acquired in Step S2060, and the user ID acquired in Step S2010 to the authentication server 1200 in association with one another (Step S2070).

The communication module 1210 of the authentication server 1200 receives the information transmitted in Step S2070 (Step S2110), and stores the information into the template storage database 1290 (Step S2120). In Step S2010, the ID acquisition module 1010 may receive input of attribute information on the user. The attribute information is information for classifying the user, which is acquired from the biometric information. The sex, age, race, and other attributes of the user are all examples of the attribute information. When the attribute information on the user is acquired in Step S2010, in Step S2070, the communication module 1070 also transmits the attribute information to the authentication server 1200 in association with the user ID.

With the above-mentioned procedure, the authentication system performs initial registration of the user, and stores the templates of the user. After this initial registration, the user can perform authentication or biometric signature described later.

Figure 4:
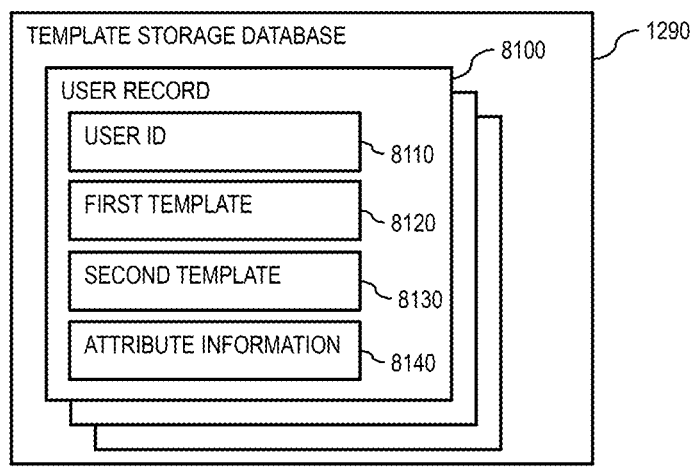
FIG. 4 is an explanatory diagram for illustrating an example of data structure of the template storage database according to the first embodiment.

FIG. 4 is an explanatory diagram for illustrating an example of data structure of the template storage database 1290. The template storage database 1290 stores one or more user records 8100. The user record 8100 stores data on each user. The user record 8100 includes, for example, a user ID 8110, a first template 8120, a second template 8130, and attribute information 8140.

The user ID 8110 is an identifier uniquely associated with the user, which is assigned in Step S2010, and is formed of a character string represented by alphanumeric characters, for example. The first template 8120 is a template to be used for intermediate comparison, which is generated in Step S2040. The second template 8130 is a template to be used for a biometric signature, which is generated in Step S2060. The attribute information 8140 stores an attribute input in Step S2010. The sex, age, race, and type of fingerprint of the user are all examples of the attribute.

Figure 5:
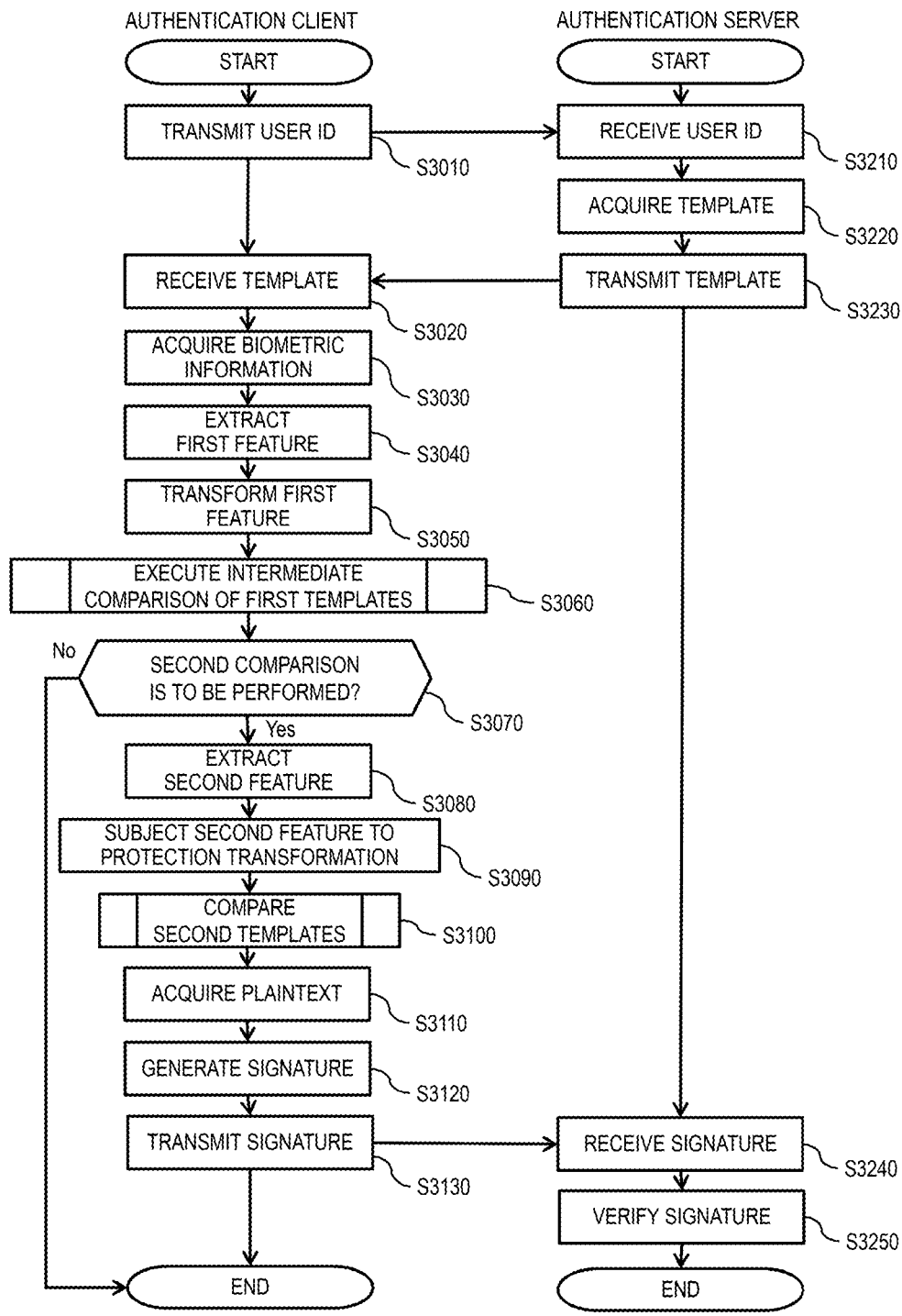
FIG. 5 is a flow chart for illustrating an example of biometric signature processing in a case where the authentication client executes one-to-one biometric signature verification processing according to the first embodiment.

FIG. 5 is a flow chart for illustrating an example of biometric signature processing in a case where the authentication client 1000 executes one-to-one biometric signature verification processing. First, the ID acquisition module 1010 of the authentication client 1000 acquires the user ID of the person to be authenticated, and the communication module 1070 transmits the user ID to the authentication server 1200 (Step S3010).

Next, the communication module 1210 of the authentication server 1200 receives the user ID transmitted in Step S3010 (Step S3210), and the template acquisition module 1230 acquires the first template and the second template, which are associated with the received user ID, from the template storage database 1290 (Step S3220).

The communication module 1210 transmits the template acquired in Step S3220 to the authentication client 1000 (Step S3230). When there is attribute information associated with the user ID, the attribute information is acquired in Step S3220, and the attribute information is also transmitted to the authentication client 1000 in Step S3220.

Next, the communication module 1070 of the authentication client 1000 receives the template (Step S3020), and the biometric information acquisition module 1020 acquires the first biometric information and the second biometric information from the user (Step S3030). The biometric information acquisition processing in Step S3030 is similar to the processing of Step S2020.

Next, the first feature extraction module 1030 extracts a feature from the first biometric information (Step S3040), and subjects the extracted first feature to transformation to generate a first template (Step S3050). The processing of Step S3040 is similar to that of Step S2030, but the processing of Step S3050 may be different from the processing of Step S2040.

For example, when the first template is generated by using cancelable biometric authentication, transformation processing on the registration side is executed in Step S2040, and transformation processing on the authentication side is executed in Step S3050. Further, for example, when encryption such as DES or AES encryption is executed in Step S2040, encryption is not required to be executed by the client at the time of signature, and thus no processing may be executed in Step S3050.

Next, the first template intermediate comparison module 1080 subjects the first template received from the authentication server 1200 and the first template generated in Step S3040 to intermediate comparison (Step S3060). Detailed processing of the intermediate comparison is described later with reference to FIG. 6.

The first template intermediate comparison module 1080 executes the processing of Step S3060 to acquire a first intermediate comparison result. The first intermediate comparison result includes a comparison parameter identified at the time of comparison of first templates and a similarity corresponding to each comparison parameter. The "comparison parameter" refers to a parameter for correcting one template at the time of comparison of templates. A parameter for correcting, for example, a positional deviation or rotational angle at the time of acquiring biometric information (e.g., at the time of picking up an image) is an example of the comparison parameter. The "similarity corresponding to the comparison parameter" refers to a similarity between templates in a case where correction indicated by the comparison parameter is executed. Details of the first intermediate comparison result are described later with reference to FIG. 7.

The second template comparison module 1090 determines whether or not to perform second comparison based on the first intermediate comparison result acquired in Step S3060 (Step S3070). Specifically, for example, when all the similarities included in the first intermediate comparison result are smaller than a predetermined value, the second template comparison module 1090 determines not to perform second comparison, whereas when one of the similarities included in the first intermediate comparison result is equal to or larger than the predetermined value, the second template comparison module 1090 determines to perform second comparison.

The processing may proceed to the processing of Step S3080 without execution of the processing of Step S3070, but for example, when the person to be authenticated can be determined to be another person by referring to the first intermediate comparison result and other data, authentication can be determined to have failed without execution of the second template comparison to output a result quickly.

When the second template comparison module 1090 determines not to perform second comparison (Step S3070: No), the biometric signature verification processing is finished. At this time, the second template comparison module 1090 may display on the input device 1104 the fact that the authentication has failed, or the communication module 1070 may notify the authentication server 1200 of the fact that the authentication has failed.

When the second template comparison module 1090 determines to perform second comparison (Step S3070: Yes), the second feature extraction module 1050 extracts a second feature from the second biometric information acquired in Step S3030 (Step S3080). The processing of Step S3080 is similar to the processing of Step S2050.

The second template generation module 1060 subjects the second feature acquired in Step S3080 to protection transformation to generate a second template (Step S3090). The processing of Step S3090 is different from the processing of Step S2060.

For example, when a method of determining whether the authentication is a success or a failure based on a norm between vectors described in JP 2013-123142 A is used for comparison of second templates, an error of the comparison parameter due to, for example, a deviation in coordinates or angle is not allowed. Thus, the second template generation module 1060 is required to determine the allowable range of the comparison parameter, and use all the comparison parameters within the allowable range to transform the second feature.

In this case, the results of transforming a single second feature by a large number of comparison parameters each serve as the second parameter. For example, when the comparison parameter includes coordinates and an angle, an image being the second feature is moved in parallel for each comparison parameter in accordance with a coordinate value indicated by the comparison parameter (namely, coordinate value included in comparison parameter indicates parallel translation amount), and an image that has been rotated in accordance with the angle of the comparison parameter is generated. A second template obtained by protection transformation is generated for each of all those images.

Further, for example, when the second template used for comparison of second templates described later is the second feature, the second template generation module 1060 does not perform transformation in Step S3090. In other words, the second template generation module 1060 determines the second feature itself as the second template. Further, when the second template used for comparison of second templates is some data after protection conversion, the second template generation module 1060 executes the transformation in Step S3090.

Further, in Step S3090, the second template generation module 1060 may use the first intermediate comparison result to narrow down the second template to be generated. Specifically, for example, at the stage of generating a second template in Step S3090, the second template generation module 1060 does not generate the second template corresponding to the comparison parameter that is not used at the time of comparison of second templates described later. With this process, it is possible to reduce the period of generating the second template and the amount of data of the second template, to thereby further speed up comparison of second templates.

Next, the second template comparison module 1090 compares the second template received from the authentication server 1200 and the second template generated in Step S3090 with each other to acquire the second comparison result (Step S3100). Detailed processing of comparison of second templates is described later with reference to FIG. 8.

The second template comparison module 1090 uses the first intermediate comparison result in the comparison in Step S3090 to narrow down comparison parameters that are likely to match, to thereby be able to speed up comparison.

The second template comparison module 1090 includes, in the second comparison result, out of the second templates after transformation by the comparison parameter in Step S3090, a second template that is successful in comparison with the second template registered in advance. Further, the second template comparison module 1090 may not include the second template itself, but may include a secret key corresponding to the second template in the second comparison result.

Next, the signature generation module 1100 acquires a plaintext to be signed (Step S3110). For example, when the user wishes to assign his or her biometric signature to some data to prevent falsification and ensure authenticity, the data to be signed is the plaintext. Further, when the purpose is for the authentication server 1200 to authenticate the user, a random number transmitted from the authentication server 1200 (hereinafter also referred to as "challenge code") is the plaintext. Further, when the challenge code is not used, the signature generation module 1100 may acquire the time of measurement by the authentication client 1000, and set this time as the plaintext.

Next, the signature generation module 1100 generates a biometric signature for the plaintext acquired in Step S3110 (Step S3120). The signature generation module 1100 may generate the biometric signature by using the method disclosed in, for example, JP 2013-123142 A, or may use any method that uses other biometric information as a key to generate the biometric signature. In the processing of Step S3120, the signature generation module 1100 uses the plaintext and the second comparison result acquired in Step S3100 to generate a biometric signature corresponding to the plaintext.

Next, the communication module 1070 transmits the plaintext acquired in Step S3110 and the biometric signature generated in Step S3120 to the authentication server 1200 (Step S3130). When the purpose of this processing is authentication and a challenge code received from the authentication server 1200 is used as the plaintext, the communication module 1070 is not required to transmit the plaintext.

Next, the communication module 1210 of the authentication server 1200 receives the plaintext and biometric signature transmitted by the authentication client 1000 in Step S3130 (Step S3240). Next, the signature verification module 1240 verifies the biometric signature received in Step S3240 (Step S3250). In the verification of the biometric signature, the signature verification module 1240 may use the method disclosed in JP 2013-123142 A, or may execute signature verification in any biometric signature system that uses other biometric information as a key.

In the processing of Step S3250, the signature verification module 1240 uses the plaintext, the biometric signature, and the second template acquired in Step S3220 to verify whether the biometric signature is valid. When the challenge code transmitted by the authentication server 1200 is used as the plaintext, the signature verification module 1240 uses the challenge code, a biometric signature (response code in this case) corresponding to the challenge code, and the second template for verification.

When an error between the second template received in Step S3020 and the second template acquired in Step S3090 is smaller than a certain value, and the signature for the plaintext is not falsified, verification by the signature verification module 1240 is successful. In this manner, high-speed biometric signature verification for authentication of the user or for the plaintext generated by the user is implemented.

Figure 6:
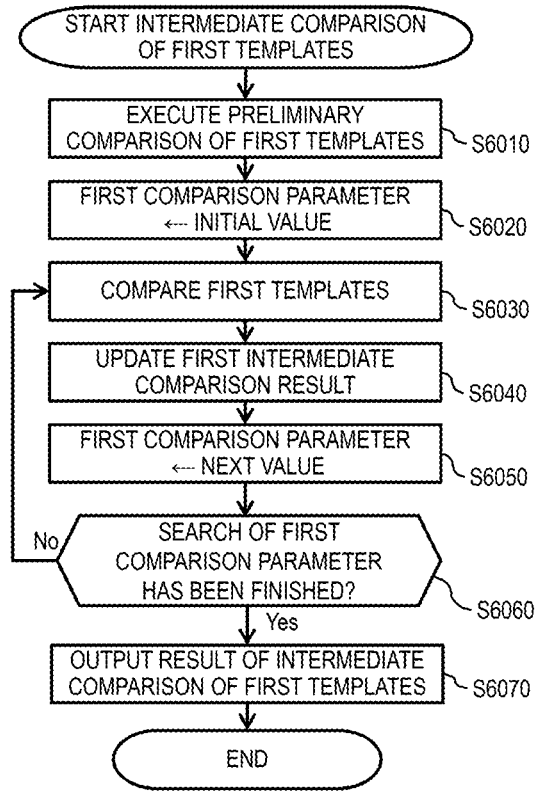
FIG. 6 is a flow chart for illustrating an example of first template intermediate comparison processing according to the first embodiment.

FIG. 6 is a flow chart for illustrating an example of first template intermediate comparison processing. A first template on the registration side (namely, first template received in Step S3020) and a first template (first template generated in Step S3050) on the authentication side are inputs in intermediate comparison of first templates. The first template intermediate comparison module 1080 compares those two first templates with each other in the intermediate comparison of first templates to output the first intermediate comparison result. Now, a detailed description is given with reference to the drawings.

First, the first template intermediate comparison module 1080 executes preliminary comparison of first templates (Step S6010). This preliminary comparison is processing to be executed once before acquisition of the result of intermediate comparison of first templates by each comparison parameter in Step S6020 and subsequent steps.

For example, when correlation-invariant random filtering is applied to comparison of first templates as the cancelable biometric authentication, this processing corresponds to processing of generating a correlation map indicating a correlation coefficient relating to each comparison parameter between the first template on the registration side and the first template on the authentication side, which is executed at the time of comparison. As the correlation coefficient, for example, a correlation coefficient relating to the first feature between the first template on the registration side and the first template on the authentication side, or a correlation coefficient relating to the luminance value at each point of the image between the first template on the registration side and the first template on the authentication side is used.

Further, for example, when the first template on the registration side is subjected to a general encryption such as DES encryption or AES encryption at the time of generation thereof, this processing corresponds to the processing of decoding the encrypted first template.

Next, the first template intermediate comparison module 1080 substitutes an initial value of the comparison parameter into a first comparison parameter (Step S6020). When coordinates or an angle is used as the comparison parameter, for example, the first template intermediate comparison module 1080 can substitute the minimum value of coordinates or an angle as the initial value, and execute comparison by each comparison parameter in an exhaustive manner by successively increasing the value of the parameter.

Next, the first template intermediate comparison module 1080 acquires a similarity between the first template on the registration side and the first template on the authentication side relating to the currently substituted comparison parameter (Step S6030). When the above-mentioned correlation map is generated, the first template intermediate comparison module 1080 acquires a correlation coefficient corresponding to the comparison parameter as the similarity.

Next, the first template intermediate comparison module 1080 compares the similarity acquired in Step S6030, which is the most recent step, with the maximum value of the similarity included in the first intermediate comparison result, and when the similarity acquired in Step S6030, which is the most recent step, exceeds the maximum value, the result of intermediate comparison of first templates is updated (Step S6040).

When the first template intermediate comparison module 1080 overwrites the result of intermediate comparison of first templates only in a case where the similarity exceeds the maximum value as described above, only one result is acquired. The first template intermediate comparison module 1080 may not compare the similarity acquired in Step S6030, which is the most recent step, with the maximum value, but may compare the similarity with a predetermined threshold value to add information to the result of intermediate comparison of first templates when the similarity is larger than the threshold value. In this case, a plurality of results are acquired.

When the accuracy of comparing first templates is sufficiently high, only one result of intermediate comparison of first templates can ensure high accuracy, but when the accuracy of comparison is not sufficiently high, it may be desired that a plurality of results of intermediate comparison of first templates be allowed to prevent degradation in accuracy due to narrowing down.

When the first template intermediate comparison module 1080 updates the result of intermediate comparison of first templates in Step S6040, the first template intermediate comparison module 1080 may estimate attribute information from the first biometric information on the authentication side based on a predetermined condition, for example, and include the estimated attribute information in the result of intermediate comparison of first templates.

The attribute information is information for classifying the user acquired from the biometric information as described above. For example, when a face image is used as the first biometric information, the first template intermediate comparison module 1080 can estimate attribute information such as the sex, age, or race of the user from the face image. Further, when a fingerprint is used as the first biometric information, the first template intermediate comparison module 1080 can use the type of a fingerprint such as a loop, a wheel, and an arch as the attribute information.

The attribute information is used for narrowing down candidate users to further speed up comparison.

Figure 7:
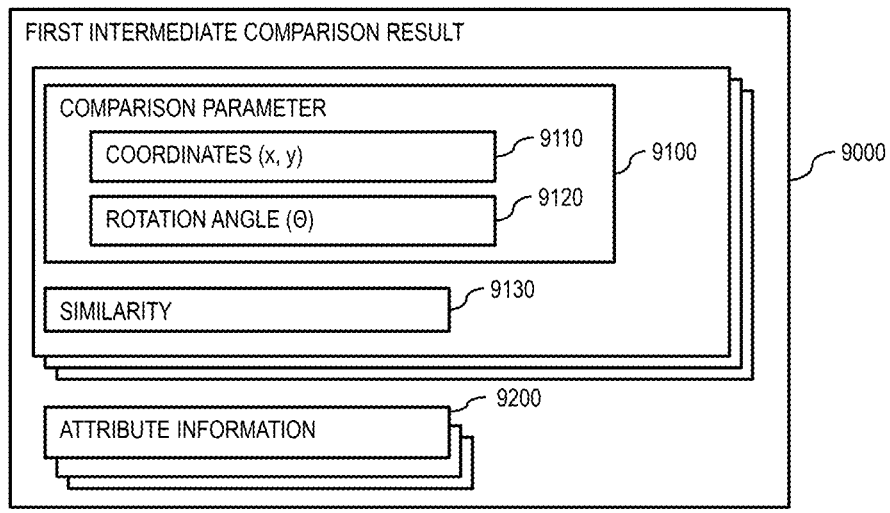
FIG. 7 is a block diagram for illustrating an example of a result of intermediate comparison of first templates according to the first embodiment.

FIG. 7 is a block diagram for illustrating an example of the result of intermediate comparison of first templates. The first template intermediate comparison result 9000 includes, for example, a comparison parameter 9100, a similarity 9130, and attribute information 9200.

In the example of FIG. 7, the comparison parameter 9100 includes coordinates 9110 and a rotation angle 9120. Specifically, at the time of update of the first intermediate comparison result in Step S6040, the first template intermediate comparison module 1080 stores the current comparison parameter into the comparison parameter 9100, and stores the similarity into the similarity 9130. Further, the first template intermediate comparison module 1080 may substitute the comparison parameter 9100 into the attribute information 9200 estimated from the first biometric information.

Next, the first template intermediate comparison module 1080 substitutes the next value into the first comparison parameter (Step S6050), and determines whether search of the first comparison parameter has been finished, that is, whether all the values of the first comparison parameter within a predetermined range have been substituted (Step S6060). When the search has not been finished (S6060: No), the first template intermediate comparison module 1080 returns to Step S6030 to continue to perform the search. When the search has been finished (S6060: Yes), the first template intermediate comparison module 1080 outputs the result of intermediate comparison of first templates (Step S6070), and finishes the first template intermediate comparison processing.

With the first template intermediate comparison processing, the result of intermediate comparison of first templates including the comparison parameter and the attribute information at the time when the similarity between first templates is high is acquired. The second template comparison module 1090 uses the result of intermediate comparison of first templates for comparison of second templates, and narrows down comparison candidates of second templates, to thereby be able to speed up comparison.

Figure 8:
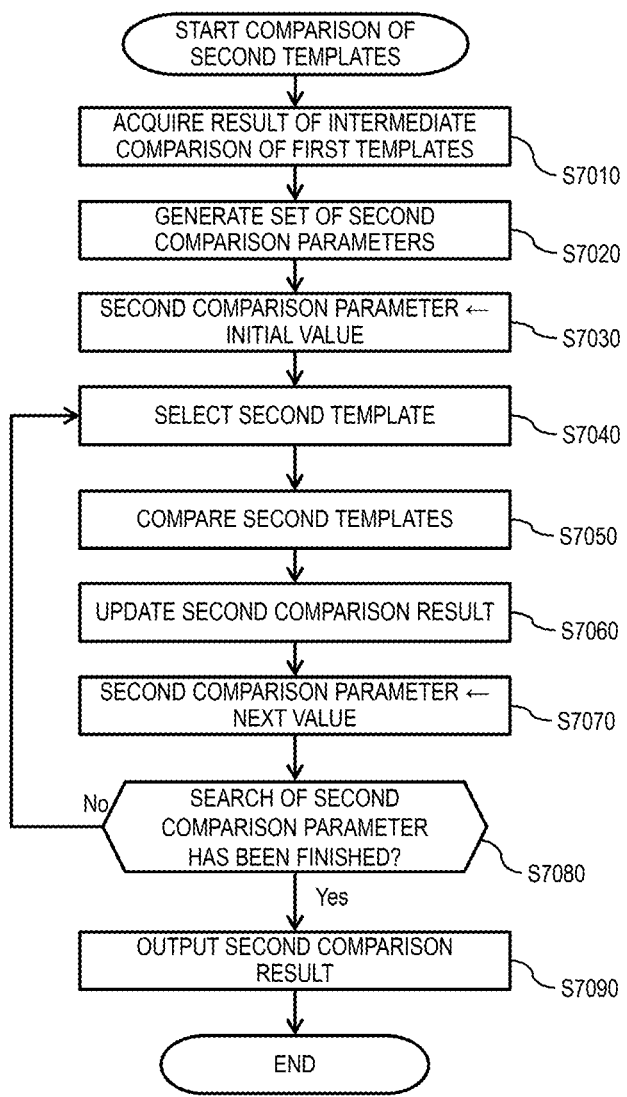
FIG. 8 is a flow chart for illustrating an example of processing of comparing second templates according to the first embodiment.

FIG. 8 is a flow chart for illustrating an example of the processing of comparing second templates. The second template comparison module 1090 compares the second template (second template received in Step S3020) on the registration side with the second template (second template generated in Step S3090) on the authentication side, and outputs a comparison result (match or mismatch), and the second template or a secret key extracted from the second template. Now, a detailed description is given with reference to the drawings.

First, the second template comparison module 1090 acquires the result of intermediate comparison of first templates acquired in Step S6070 (Step S7010). Next, the second template comparison module 1090 generates a set of second comparison parameters based on the result of intermediate comparison of first templates acquired in Step S7010 (Step S7020).

As illustrated in FIG. 7, the first template intermediate comparison result 9000 includes the comparison parameter 9100 at the time when the similarity between first templates is high. The first template and the second template are transformed from the biometric information acquired from the same part of the user, and thus comparison parameters due to a deviation in a living body such as the coordinates or rotation angle at the time of comparison are common.

In other words, the similarity between first templates and the similarity between second templates are both considered to be high when correct comparison parameters are adopted. In the processing of Step S7010, the second template comparison module 1090 uses this nature to limit comparison parameters to be searched at the time of comparison of second templates to comparison parameters included in the result of intermediate comparison of first templates and a close range thereof.

For example, when the comparison parameters of first templates are coordinates (10, 10) and a rotation angle (5 degrees), the second template comparison module 1090 searches comparison parameters within a range of coordinates (10±α, 10±α) and a rotation angle (5±β degrees) at the time of comparison of second templates. The value $\alpha$ ($0 \leq \alpha$) is a predetermined allowable error for coordinates, and the value $\beta$ ($0 \leq \beta$) is a predetermined allowable error for a rotational angle. The allowable error is defined so that the search range in comparison of second templates is included in the search range in intermediate comparison of first parameters.

The second template comparison module 1090 generates, for example, a combination of comparison parameters within this allowable range as the set of second comparison parameters. Further, when a plurality of comparison parameters are included in the result of intermediate comparison of first templates, the second template comparison module 1090 acquires a close range for all the comparison parameters, and generates a union of all the comparison parameters and all the close ranges as the set of second comparison parameters.

In the related-art biometric signature method, a set of all the allowed comparison parameters is required to be used as the set of second comparison parameters. Thus, in the related-art biometric signature method, the set of second comparison parameters includes a numerous number of comparison parameters. However, in the first embodiment, the second template comparison module 1090 limits comparison parameters included in the set of second comparison parameters to the close range of comparison parameters of first templates, to thereby suppress the number of parameters and speed up comparison processing.

Next, the second template comparison module 1090 substitutes an initial value into the second comparison parameter (Step S7030). All the combinations of values that may be taken by second comparison parameters are stored in the set of second comparison parameters in Step S7020, and thus the second template comparison module 1090 uses, as an initial value, a comparison parameter stored at the head of the set of second comparison parameters.

Next, the second template comparison module 1090 selects a second template corresponding to the second comparison parameter substituted in Step S7030 (Step S7040). Next, the second template comparison module 1090 compares the second template selected in Step S7040 with the second template on the registration side to determine whether those second templates match each other (Step S7050). The second template comparison module 1090 uses, for example, a method of verifying a biometric signature disclosed in JP 2013-123142 A to execute the processing of Step S7050.

When the second template comparison module 1090 determines that the second templates match each other in Step S7050, the second template comparison module 1090 includes, in the second comparison result, the second template selected in Step S7050 or the secret key extracted from the second template (Step S7060). The secret key is information capable of being extracted only when comparison of second templates is successful. A signature generated by using this secret key can be verified by using second templates stored in the template storage database 1290.

When the second template comparison module 1090 determines that the second templates do not match each other in Step S7050, the second template comparison module 1090 does not update the second comparison result in Step S7060, and proceeds to Step S7070 described later. On the contrary, when the second template comparison module 1090 determines that the second templates match each other in Step S7050, the second template comparison module 1090 may proceed to Step S7090 described later after updating the second comparison result in Step S7060 as described above.

Next, the second template comparison module 1090 substitutes a next value into the second comparison parameter (Step S7070). Next, the second template comparison module 1090 determines whether search of all the comparison parameters included in the set of second comparison parameters has been finished, that is, whether all the values included in the set of second comparison parameters have been substituted (Step S7080). When search of all the comparison parameters has been finished (Step S7080: Yes), the second template comparison module 1090 outputs the second comparison result obtained at that time (Step S7090), and finishes the second template comparison processing. When search of comparison parameters has not been finished (Step S7080: No), the second template comparison module 1090 returns to Step S7040 to continue to perform the search.

The second template comparison module 1090 acquires the second template or a secret key extracted from the second template as the second comparison result by the second template comparison processing. When the second template comparison module 1090 has failed to compare second templates (when the second template on the authentication side and the second template on the registration side do not match each other for all the comparison parameters) with each other, the second template and the secret key cannot be acquired as the second comparison result, and thus biometric signature processing in Step S3110 and subsequent steps is suspended, and the authentication is determined to have failed.

In the above-mentioned example of FIG. 5, the authentication client 1000 verifies a biometric signature, generates a signature by a key that can verify the biometric signature, and transmits the signature to the authentication server 1200. Contrary to this process, the authentication client 1000 may generate a biometric signature offline without acquiring information from the authentication server 1200 at all. In this case, the authentication server 1200 verifies the biometric signature.

Figure 9:
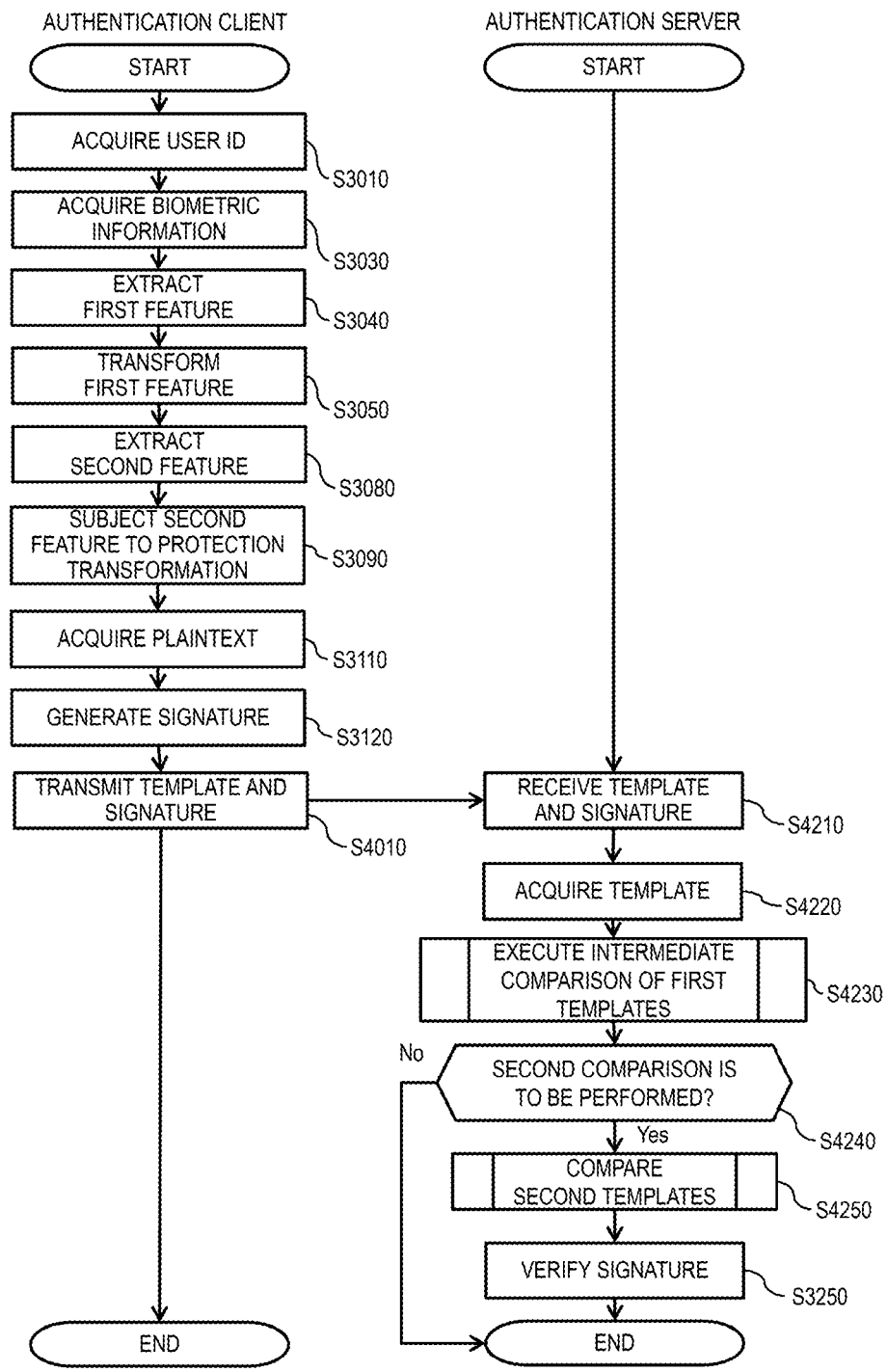
FIG. 9 is a flow chart for illustrating an example of biometric signature processing in a case where an authentication server executes one-to-one biometric signature verification according to the first embodiment.

FIG. 9 is a flow chart for illustrating an example of biometric signature processing in a case where the authentication server 1200 executes one-to-one biometric signature verification. A description is given of a difference from FIG. 9. To implement the processing of FIG. 9, the authentication server 1200 includes a first template generation module and a second template comparison module.

In Step S3090, the signature generation module 1100 cannot narrow down second templates by using the result of intermediate comparison of first templates, and thus the signature generation module 1100 does not narrow down second templates, but uses second templates corresponding to all the allowable comparison parameters to generate a biometric signature.

The communication module 1070 transmits, to the authentication server 1200, the user ID acquired in Step S3010, the first template acquired in Step S3050, the second template acquired in Step S3070, the plaintext acquired in Step S3080, and the biometric signature acquired in Step S3090 (Step S4010).

The communication module 1210 of the authentication server 1200 receives the user ID, the first template, the second template, the plaintext, and the biometric signature (Step S4210). Next, the template acquisition module 1230 acquires the template on the registration side associated with the received user ID from the template storage database 1290 (Step S4220).

The processing of from Step S4230 to Step S4250 is similar to processing with the same name to be executed by the authentication client 1000 in FIG. 5, and thus a description thereof is omitted. In the example of FIG. 9, the authentication server 1200 executes the processing. After the processing of Step S4250, the signature verification module 1240 executes the signature verification processing of Step S3250.

Second Embodiment

A biometric signature system according to a second embodiment of the present invention executes one-to-N biometric signature in which the user does not input an ID. Also in the biometric signature system according to the second embodiment, the first biometric information is used for intermediate comparison and the second biometric information is used for biometric signature, to thereby be able to execute authentication and signature verification at high speed. Now, a difference from the first embodiment is described.

Figure 10:
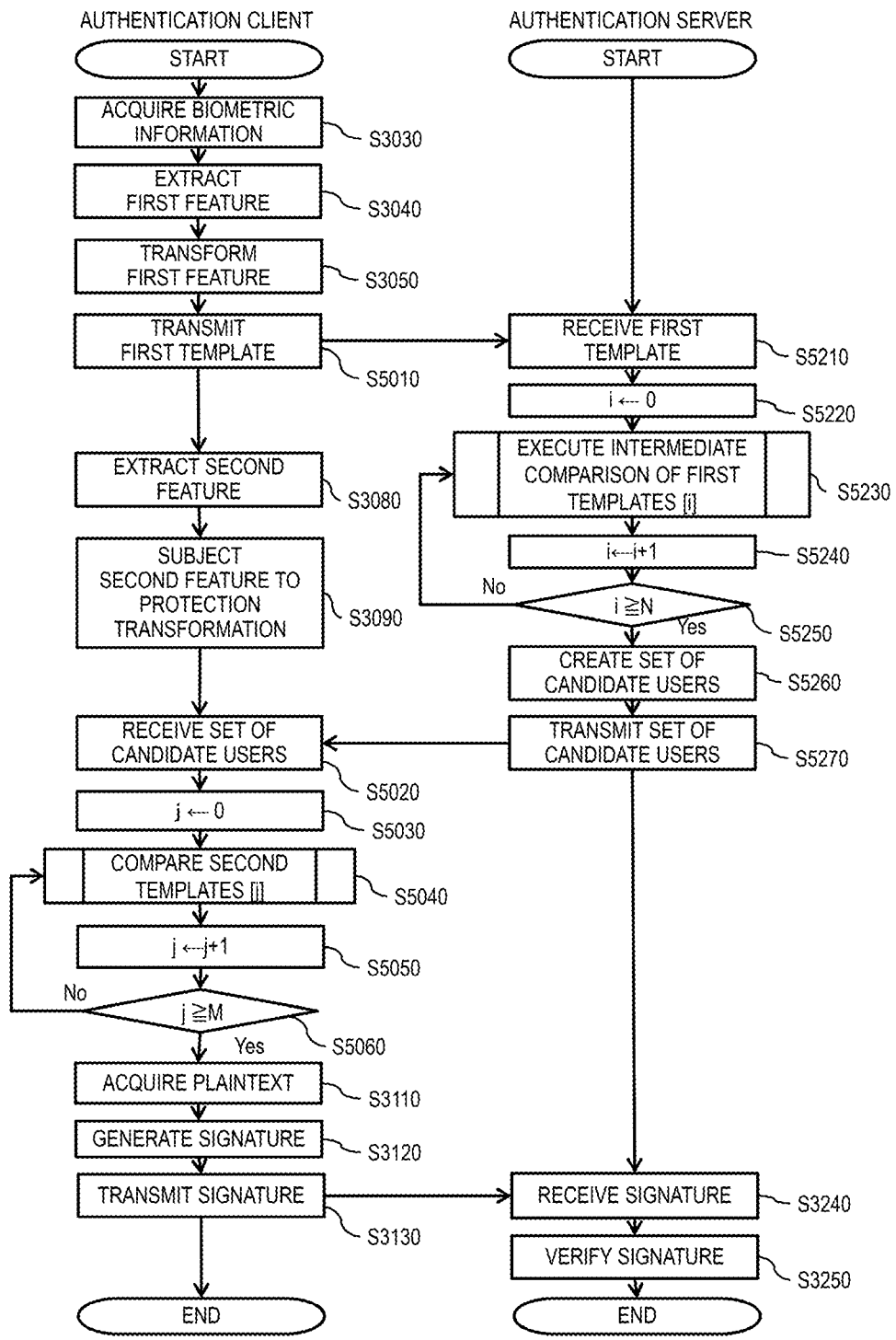
FIG. 10 is a flow chart for illustrating an example of one-to-N biometric signature verification processing according to the second embodiment.

FIG. 10 is a flow chart for illustrating an example of one-to-N biometric signature verification processing. Now, a difference from FIG. 5 is described. In the one-to-N biometric signature, the user ID of the person to be authenticated is not input, and thus the processing of FIG. 10 starts from Step S3030, and subsequently, the processing of Step S3040 and Step S3050 is executed.

Next, the communication module 1070 transmits the first template generated in Step S3050 to the authentication server 1200 (Step S5010). The communication module 1210 of the authentication server 1200 receives the first template (Step S5210). It is assumed that N first templates are stored in the template storage database 1290. The first template intermediate comparison module 1220 executes intermediate comparison of the first template received in Step S5210 with each of all (N) the first templates stored in the template storage database 1290 (Step S5220 to Step S5250).

Next, the first template intermediate comparison module 1220 creates a candidate user set from the first template intermediate comparison result 9000 acquired in Step S5230 (Step S5260). For example, the first template intermediate comparison module 1220 includes, in the candidate user set, only the information on a user for which the similarity in the result of intermediate comparison of first templates is equal to or larger than a predetermined value. Further, when attribute information is input together with biometric information in Step S3030, the first template intermediate comparison module 1220 may estimate attribute information from the first biometric information on the authentication side, and may not include, in the candidate user set, information on a user for which the estimated attribute information and the input attribute information do not match each other. An example of data structure of the candidate user set is described later with reference to FIG. 11.

Next, the communication module 1210 transmits the candidate user set acquired in Step S5260 to the authentication client 1000 (Step S5270). The communication module 1070 of the authentication client 1000 receives the candidate user set from the authentication server 1200 (Step S5020). The second template comparison module 1090 executes, only for each user (it is assumed that the number of users included in the candidate user set is M) included in the candidate user set, second template comparison by using a comparison parameter corresponding to the user (Step S5030 to Step S5060).

The related-art one-to-N biometric signature system is required to execute signature verification for all the N second templates (namely, all the registered second templates) in the authentication client or authentication server. The biometric signature verification processing is processing requiring a larger amount of calculation than that of intermediate comparison of first templates. The one-to-N biometric signature system requires an N times larger amount of verification processing than that of the one-to-one biometric signature system, and thus a period of time required for signature verification is extremely long.

In contrast, the biometric signature system according to the second embodiment executes intermediate comparison of first templates in the authentication server 1200, and narrows down users and comparison parameters to be subjected to second template comparison, to thereby be able to speed up authentication or signature verification. The authentication client 1000 may execute intermediate comparison of first templates, for example, or the authentication server 1200 may execute comparison of second templates.

Figure 11:
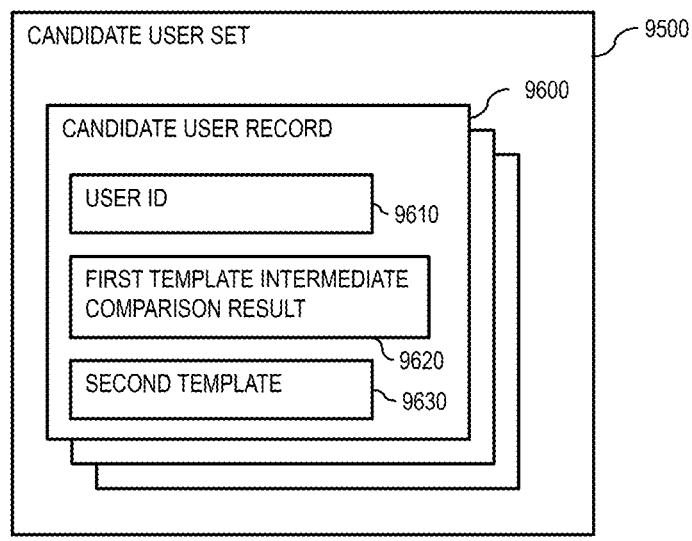
FIG. 11 is an explanatory diagram for illustrating an example of data structure of a candidate user set according to the second embodiment.

FIG. 11 is an explanatory diagram for illustrating an example of data structure of the candidate user set. A candidate user set 9500 includes one or more candidate user records 9600. The candidate user record 9600 stores information on candidate users determined to be compared with the second template. Specifically, the candidate user record 9600 includes, for example, a user ID 9610, a first template intermediate comparison result 9620, and a second template 9630.

The user ID 9110 stores a user ID of a candidate user. The first template intermediate comparison result 9620 is a result acquired by intermediate comparison of first templates in Step S5230, and has, for example, the structure similar to that of the first template intermediate comparison result 9000 illustrated in FIG. 7. The second template 9630 is data generated in Step S3090.

The authentication server 1200 transmits the candidate user set 9500 having the above-mentioned data structure to the authentication client 1000, and the authentication client 1000 executes second template comparison for users included in the candidate user set 9500, to thereby be able to implement high-speed signature generation and signature verification.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A biometric signature system, comprising a processor and a memory,
   the memory being configured to hold:
      a first template indicating a result of transforming, by predetermined transformation, first biometric information acquired from a predetermined part of a user; and
      a second template indicating a result of transforming, by predetermined one-way transformation, second biometric information acquired from the predetermined part of the user,
   the processor being configured to:
      acquire the first biometric information and the second biometric information from a person to be authenticated;
      generate a first template of the person to be authenticated from the acquired first biometric information;
      identify a parameter for which a similarity between the first template of the person to be authenticated corrected by using the parameter and the first template held in the memory is larger than a predetermined condition;
      correct the second biometric information on the person to be authenticated by using each parameter included in a predetermined range including the identified parameter;
      generate a second template of the person to be authenticated from each piece of corrected second biometric information; and
      determine whether authentication of the person to be authenticated is successful by comparing each generated second template with the second template held in the memory.

2. The biometric signature system according to claim 1, wherein the processor is configured to generate the first template of the person to be authenticated by transforming the acquired first biometric information by the predetermined transformation.

3. The biometric signature system according to claim 1, wherein the processor is configured to generate the second template of the person to be authenticated by transforming each piece of corrected second biometric information by the predetermined one-way transformation.

4. The biometric signature system according to claim 1, wherein a correlation coefficient between the first biometric information and the second biometric information, which are stored in the memory, is equal to or smaller than a predetermined value.

5. The biometric signature system according to claim 1, wherein the parameter includes a parameter indicating a parallel translation amount in correction of the first template and the second template, and a parameter indicating a rotation amount in the correction.

6. The biometric signature system according to claim 1, wherein the memory is configured to hold respective first templates and second templates of a plurality of users, and wherein the processor is configured to:
identify a group of users corresponding to a first template having the parameter for which the similarity is larger than the predetermined condition among the first templates held in the memory;
for each user of the identified group of users,
use each parameter included in the predetermined range including the identified parameter to correct the second biometric information on the person to be authenticated, to thereby generate a second template; and
compare each generated second temple with a second template of the each user; and
determine whether authentication of the person to be authenticated is successful based on a comparison result for each user of the identified group of users.

7. A biometric signature method by a biometric signature system,
the biometric system being configured to hold:
a first template indicating a result of transforming, by predetermined transformation, first biometric information acquired from a predetermined part of a user; and
a second template indicating a result of transforming, by predetermined one-way transformation, second biometric information acquired from the predetermined part of the user,
wherein the biometric signature method includes:
acquiring, by the biometric signature system, the first biometric information and the second biometric information from a person to be authenticated;
generating, by the biometric signature system, a first template of the person to be authenticated from the acquired first biometric information;
identifying, by the biometric signature system, a parameter for which a similarity between the first template of the person to be authenticated corrected by using the parameter and the first template held in the biometric signature system is larger than a predetermined condition;
correcting, by the biometric signature system, the second biometric information on the person to be authenticated by using each parameter included in a predetermined range including the identified parameter;
generating, by the biometric signature system, a second template of the person to be authenticated from each piece of corrected second biometric information; and
determining, by the biometric signature system, whether authentication of the person to be authenticated is successful by comparing each generated second template with the second template held in the biometric signature system.

8. The biometric signature method according to claim 7, includes generating, by the biometric signature system, the first template of the person to be authenticated by transforming the acquired first biometric information by the predetermined transformation.

9. The biometric signature method according to claim 7, includes generating, by the biometric signature system, the second template of the person to be authenticated by transforming each piece of corrected second biometric information by the predetermined one-way transformation.

10. The biometric signature method according to claim 7, wherein a correlation coefficient between the first biometric information and the second biometric information, which are stored in the biometric signature system, is equal to or smaller than a predetermined value.

11. The biometric signature method according to claim 7, wherein the parameter includes a parameter indicating a parallel translation amount in correction of the first template and the second template, and a parameter indicating a rotation amount in the correction.

12. The biometric signature method according to claim 7, wherein the biometric signature system is configured to hold respective first templates and second templates of a plurality of users, and
wherein the biometric signature method includes:
identifying, by the biometric signature system, a group of users corresponding to a first template having the parameter for which the similarity is larger than the predetermined condition among the first templates held in the biometric signature system;
for each user of the identified group of users,
using, by the biometric signature system, each parameter included in the predetermined range including the identified parameter to correct the second biometric information on the person to be authenticated, to thereby generate a second template; and
comparing, by the biometric signature system, each generated second temple with a second template of the each user; and
determining, by the biometric signature system, whether authentication of the person to be authenticated is successful based on a comparison result for each user of the identified group of users.

* * * * *